US010762906B2

(12) United States Patent
Ferreira Moreno et al.

(10) Patent No.: US 10,762,906 B2
(45) Date of Patent: Sep. 1, 2020

(54) AUTOMATICALLY IDENTIFYING SPEAKERS IN REAL-TIME THROUGH MEDIA PROCESSING WITH DIALOG UNDERSTANDING SUPPORTED BY AI TECHNIQUES

(71) Applicant: International Business Machines Corporation, Armonk, NY (US)

(72) Inventors: Marcio Ferreira Moreno, Rio de Janeiro (BR); Helon Vicente Hultmann Ayala, Rio de Janeiro (BR); Daniel Salles Chevitarese, Rio de Janeiro (BR); Rafael R. de Mello Brandao, Rio de Janeiro (BR); Renato Fontoura de Gusmao Cerqueira, Barra da Tijuca (BR)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 15/967,829

(22) Filed: May 1, 2018

(65) Prior Publication Data
US 2019/0341059 A1    Nov. 7, 2019

(51) Int. Cl.
*G10L 17/22* (2013.01)
*G10L 17/26* (2013.01)
*G10L 15/26* (2006.01)

(52) U.S. Cl.
CPC .............. *G10L 17/22* (2013.01); *G10L 15/26* (2013.01); *G10L 17/26* (2013.01)

(58) Field of Classification Search
USPC .................... 704/235, 246, 247, 251, 252
See application file for complete search history.

(56) References Cited

U.S. PATENT DOCUMENTS

| 6,438,520 B1 | 8/2002 | Curt et al. |
| 6,853,716 B1 | 2/2005 | Shaffer et al. |
| 6,931,113 B2 | 8/2005 | Ortel |
| 7,305,078 B2 | 12/2007 | Kardos |

(Continued)

OTHER PUBLICATIONS

Sahidullah, M., et al., "Local spectral variability features for speaker verification", Digital Signal Processing (2016), Available online Nov. 18, 2015, Mar. 2016, pp. 1-11, vol. 50.

(Continued)

*Primary Examiner* — Leonard Saint Cyr
(74) *Attorney, Agent, or Firm* — Scully, Scott, Murphy & Presser, P.C.; Joseph Petrokaitis (57) ABSTRACT

Automatically identifying speakers in real-time through media processing with dialog understanding. A plurality of audio streams may be received, an audio stream representing a speech of a participant speaking during an online meeting. A voice characteristic of a voice corresponding to the speech of the participant in the audio stream may be determined. The plurality of audio streams may be converted into text and a natural language processing may be performed to determine content context of the dialog. The natural language processing infers a name to associate with the voice in the audio stream based on the determined content context. A data structure linking the name with the voice may be created and stored in a knowledge base. A user interface associated with the online meeting application is triggered to present the name or identity of the speaker.

19 Claims, 11 Drawing Sheets

(56) References Cited

U.S. PATENT DOCUMENTS

| | | |
|---|---|---|
| 8,050,917 B2 | 11/2011 | Caspi et al. |
| 8,249,233 B2 | 8/2012 | Loupia et al. |
| 8,934,652 B2 | 1/2015 | Lord et al. |
| 9,083,808 B2 | 7/2015 | Penberthy et al. |
| 9,094,524 B2 | 7/2015 | Krishnan et al. |
| 9,123,330 B1 | 9/2015 | Sharifi et al. |
| 9,245,254 B2 | 1/2016 | Lord et al. |
| 9,672,829 B2* | 6/2017 | Chen ................ H04N 7/147 |
| 9,704,488 B2 | 7/2017 | Kashtan et al. |
| 9,742,823 B2 | 8/2017 | Tichauer |
| 9,832,559 B2* | 11/2017 | Geiger ............... H04M 1/0258 |
| 2003/0125954 A1 | 7/2003 | Bradley et al. |
| 2003/0231746 A1 | 12/2003 | Hunter et al. |
| 2007/0266092 A1 | 11/2007 | Schweitzer, III |
| 2009/0086949 A1 | 4/2009 | Caspi et al. |
| 2010/0177880 A1 | 7/2010 | Danielsen |
| 2012/0287218 A1 | 11/2012 | Ok |
| 2013/0003945 A1* | 1/2013 | Caldwell ............ H04M 1/2475 379/88.01 |
| 2013/0271559 A1* | 10/2013 | Feng .................... H04N 7/142 348/14.08 |
| 2013/0332531 A1 | 12/2013 | Satoh |
| 2015/0296061 A1* | 10/2015 | Geiger ............... H04M 1/0258 348/14.12 |
| 2016/0118047 A1 | 4/2016 | Jaiswal et al. |
| 2016/0275952 A1* | 9/2016 | Kashtan ................ G10L 17/00 |
| 2016/0284354 A1* | 9/2016 | Chen .................... H04N 7/147 |
| 2016/0309252 A1* | 10/2016 | Geiger ............... H04M 1/0258 |
| 2017/0278518 A1* | 9/2017 | Kashtan ................ G10L 17/00 |

OTHER PUBLICATIONS

Kanervisto, A., "Effects of Gender Information in Text-Independent and Text-Dependent Speaker Verification", 2017 IEEE International Conference on Acoustics, Speech and Signal Processing (ICASSP), Mar. 5-9, 2017, pp. 5360-5364.

Sholokhov, A., et al., "Semi-supervised speech activity detection with an application to automatic speaker verification", Computer Speech & Language (2018), Received Oct. 10, 2016, Revised May 23, 2017, Accepted Jul. 7, 2017, Available online Jul. 20, 2017, pp. 132-156, vol. 47.

* cited by examiner

AUTOMATICALLY IDENTIFYING SPEAKERS IN REAL-TIME THROUGH MEDIA PROCESSING WITH DIALOG UNDERSTANDING SUPPORTED BY AI TECHNIQUES

FIELD

The present application relates generally to computers and computer applications, and more particularly to speech recognition, natural language processing and voice identification in online meeting systems.

BACKGROUND

In a computer-implemented remote conference meeting, participants are not identified automatically and considerable amount of time is spent on each participant identifying oneself. As the number of participants increase, this task becomes even more cumbersome and prone to confusion. Due to the globalization of workforce and current trends in individuals working from remote offices, for example, it is expected that this problem will contribute to increase inefficiency in resources. Even with authenticated devices, the problem remains, since multiple participants may be located in or associated with the same device. Therefore, there is a need to automate the task of automatically identifying the speakers in the conversation, for example, in online meetings or chat rooms, in a pervasive way such that the cadence of the meetings are not changed due to the necessary speaker identification.

BRIEF SUMMARY

A method and system may be provided which automatically identify speakers in real-time through media processing may be provided. The method, in one aspect, may include receiving a plurality of audio streams, an audio stream representing a speech of a participant speaking into a microphone during an online meeting, the plurality of audio streams forming a dialog among a plurality of participants in the online meeting. The method may also include determining a voice characteristic of a voice corresponding to the speech of the participant in the audio stream. The method may further include converting the plurality of audio streams into text and performing a natural language processing to determine content context of the dialog, the natural language processing inferring a name to associate with the voice in the audio stream based on the determined content context. The method may also include creating a data structure linking the name with the voice characteristic of the voice and storing the data structure in a knowledge base. The method may further include triggering the name to be presented on a user interface associated with the online meeting application.

A system of automatically identifying speakers in real-time through media processing with dialog understanding, in one aspect, may include at least one hardware processor and a memory device coupled to the at least one hardware processor. The at least one hardware processor may be operable to receive a plurality of audio streams, an audio stream representing a speech of a participant speaking into a microphone during an online meeting, the plurality of audio streams forming a dialog among a plurality of participants in the online meeting. The at least one hardware processor may be further operable to determine a voice characteristic of a voice corresponding to the speech of the participant in the audio stream. The at least one hardware processor may be further operable to convert the plurality of audio streams into text and perform a natural language processing to determine content context of the dialog, the natural language processing inferring a name to associate with the voice in the audio stream based on the determined content context. The at least one hardware processor may be further operable to create a data structure linking the name with the voice characteristic of the voice and store the data structure on the memory device as part of a knowledge base. The at least one hardware processor may be further operable to trigger the name to be presented on a user interface associated with the online meeting application.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In remote conference application settings such as online meeting applications, chat room applications or the like, different equipments may be used locally to enable many participants, sometimes co-located, to engage in conversation. Usually, at the start of such meetings, the participants introduce or identify themselves to others, for example, by speech. A system, method and techniques may be provided, which is capable of automatically extracting the identification of the participants. A system of the present disclosure, in some embodiments, may include (i) an audio features extraction component or processing for speaker identification (ID) recognition; (ii) a dialog understanding through natural language processing; (iii) knowledge graph representation from the dialog. In some embodiments, the audio signal of the participants is categorized so that it is possible to identify its source and also to enable the dialog transcription, which is fed via natural language processing for the dialog understanding component. In some embodiments, the conversation is then structured in knowledge graphs, which makes possible to associate the names of the participants naturally exchanged during the meetings.

In an audio conference, the participants engage in conversation or dialog by speaking into a microphone (or another like device) coupled to the device the participants are using in the conference. The speech is transmitted as audio signals captured by the microphones the participants use. In some embodiments, the system and/or method of the present disclosure may process the audio signal to identify speakers. The audio signals are also used to convert the speech to text. The information contained in the audio can be used computationally when the speech is transformed to text and the information contained in the text is processed, e.g., by natural language processing, to be labeled and associated with a given speaker.

By capturing and processing speech streams, it is possible to apply artificial intelligence (AI) methods such as natural language processing (NPL) to also extract relevant concepts from the speech and to infer the author of the speech, for example, who is speaking. This information can be structured and stored in a knowledge base. The knowledge base allows to query information such as "who is talking?" and "what is the profile of this speaker?" retrieving information such as names and other terms that identify interlocutors in the speech. For example, if the speaker says "Hi, this is John", the proposed system creates data structures that link this speaker ID to the named entity "John" Likewise, if someone asks John "John, can you repeat please", the system in some embodiments attribute the name "John" to the speaker that answers to it. The system in some embodiments uses crawlers and search engine components to retrieve specific and additional information about the named entity "John". For instance, if there is a "John Abcd" in the current meeting invitation, the crawler is able to fetch this information, for example, by searching metadata providing information such as the participant names associated with the current meeting invitation. Moreover, such information may be used to exploit the search engines to further qualify "John Abcd". The system, in some embodiments, implements natural language processing (NLP) and knowledge graph methods to relate computationally the information to its speaker or receiver.

The following example illustrates other possible inferences through natural language processing and knowledge graph queries.

Speaker1—"Hi guys this is Alice"; Voice characteristics of Speaker1 are associated with id=Alice; The system of the present disclosure is able to identify Alice, regardless of whether Alice has multiple colleagues in the same place using the same equipment in the call.

Alice—"Bob did you manage to finish your task?"

Speaker2—"Yes I did!"; Voice characteristics of Speaker2 are associated with id=Bob; The system of the present disclosure is able to identify Bob, regardless of whether Bob has multiple colleagues in the same place using the same equipment in the call.

Speaker3—"Yes, Bob, but I don't think you did it right."

Bob—"Why are you doing this, David?"; Voice characteristics of Speaker3 are associated with id=David; The system of the present disclosure is able to identify David, regardless of whether David has multiple colleagues in the same place using the same equipment in the call.

Figure 1:
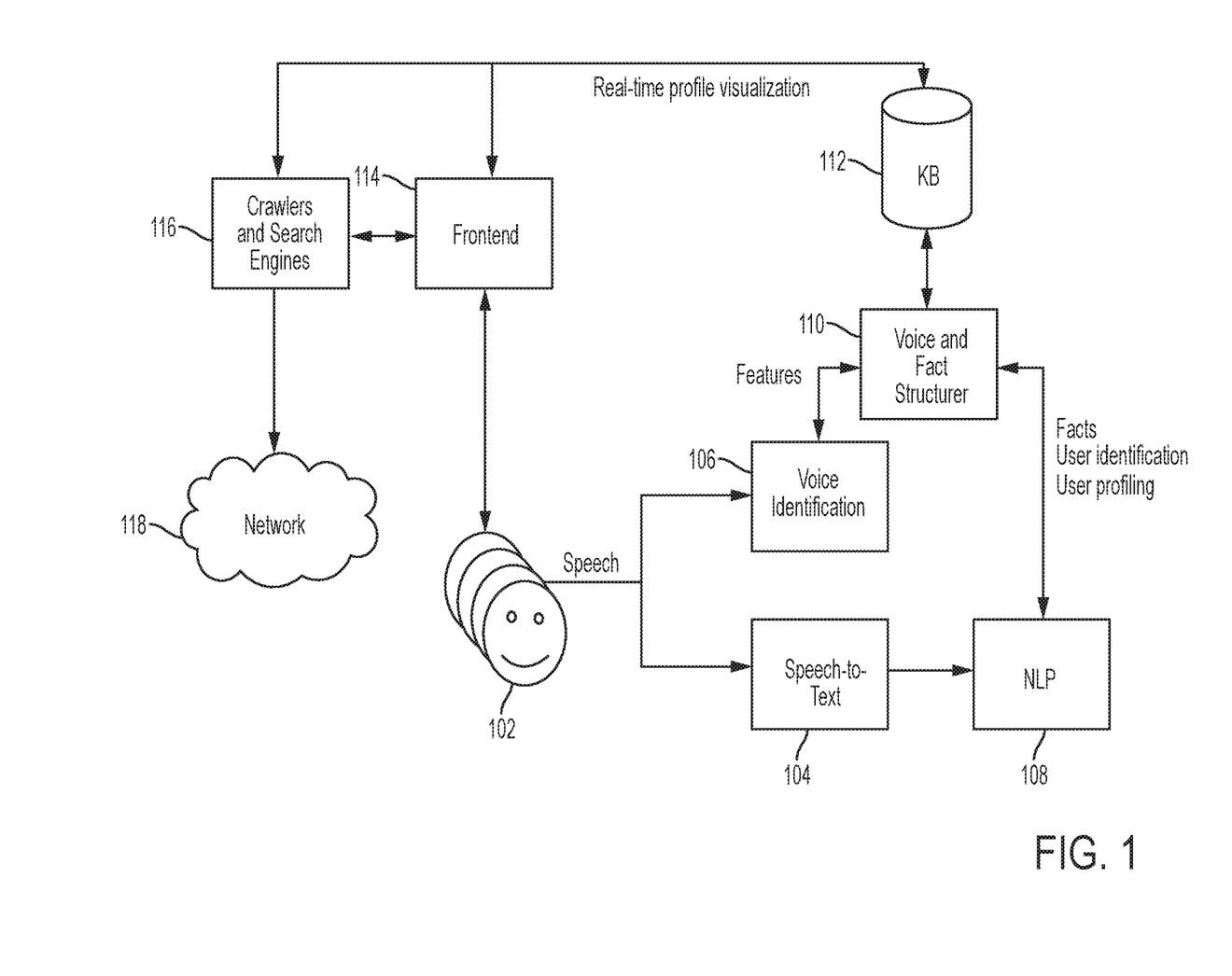
FIG. 1 is a diagram illustrating an overview of components and information flows among the components in one embodiment.

FIG. 1 is a diagram illustrating an overview of components and information flows among the components in one embodiment. The components implement the functionalities executable by one or more hardware processors. Participants 102 exchange information through audio streams that are processed by a speech-to-text component 104 and a voice identification component 106. For instance, there may be a plurality of participants 102 joining and participating in on online meeting, for example, by opening or executing an online meeting application or navigating to an uniform resource locator (URL) of a web site that provides the online meeting utilities, on their respective devices coupled with a microphone or the like equipment.

The speech-to-text component 104 receives as input the audio stream of speaker's speech, converts or transforms the audio speech to text, and outputs the processed content (text) to a natural language processing (NLP) component 108. The natural language processing (NLP) component 108 extracts and constructs facts from the converted text, and delivers the facts to a voice and fact structure component 110. Facts may be specified as subject-predicate-object (SPO) triples that structure the dialog, identifying the agent (subject), a relationship (predicate) and the target of the relationship (object). For instance, in the sentence "Alice is a Software Engineer", the subject is "Alice", the predicate is "is a" and the object is "Software Engineer". Different representations may be used. In some aspects, the NLP component 108 may implement one or more of supervised, unsupervised and/or semi-supervised machine learning algorithms, for example, to extract facts from the dialog that has been converted or transformed to text.

The voice identification component 106, for instance, may include analog-to-digital converter (ADC) that may translate analog waves representing a speaker's voice into digital data, for example, by measuring the waves at intervals (sampling the sound). The voice identification component 106 may determine voice characteristics associated with the sampled digital data and may also assign a unique ID to the sample digital data. Different vocal characteristics may be used and correlated to identify an interlocutor, such as, timbre, frequency, timing measurements, wave lengths, and other vocal footprints.

The voice and fact structure component 110 correlates the voice with speaker facts to be stored in a knowledge base 112. For instance, voice characteristics determined of the sample digital data may be linked to the speaker facts, e.g., name. The knowledge base 112 also keeps temporal information from the processed dialog, which can be used by the NLP component 108 to correlate the voice identification to the speech. For instance, if the sentence "Bob did you manage to finish your task?" precedes in time the sentence "Yes, I did", the NLP techniques may correlate the interlocutor of the second sentence with the target of the first sentence. In some embodiments, NLP parsed trees may provide the syntactic structure of each sentence, identifying lexicons such as Noun Phrase (NP), Verb Phrase (VP), Noun (N). In some embodiments, phrases are stored as fact triples, where NP is mapped into the subject of the facts, while VP is mapped into the predicate, and the N related to the VP is mapped into the object.

The front-end component 114 can then query the knowledge base 112, so it is possible to show the profiling of the speaker while the speaker speaks, for example, during an online conference. For example, responsive to a speaker speaking, the speaker's voice characteristics may be determined and the knowledge base 112 may be queried to determine the speaker's identity (e.g., name). The identified name may be presented on the participants' devices, for example, as the speaker is speaking.

The crawlers and search engines component 116 may be composed by crawlers and search engines. The crawlers are multiple agents that are programmed to extract information from specific documents and services. The system of the present disclosure in some embodiments brings default agents that, for instance, look for participants in meeting invitations. For example, information or metadata associated with a meeting invitation may include full names of participants. So for example, a speaker's name identified in a dialog via an NLP component may further be augmented to include the speaker's full name, for example, by matching the speaker's name identified in a dialog with at least a portion of the name found in the metadata of the meeting invitation. The crawlers and search engines component 116 may also search over a network 118, for example, on the Internet or an intranet, for additional information to complement the dialog information extracted by other components, including a speech-to-text component 104 and a voice identification component 106.

Figure 2:
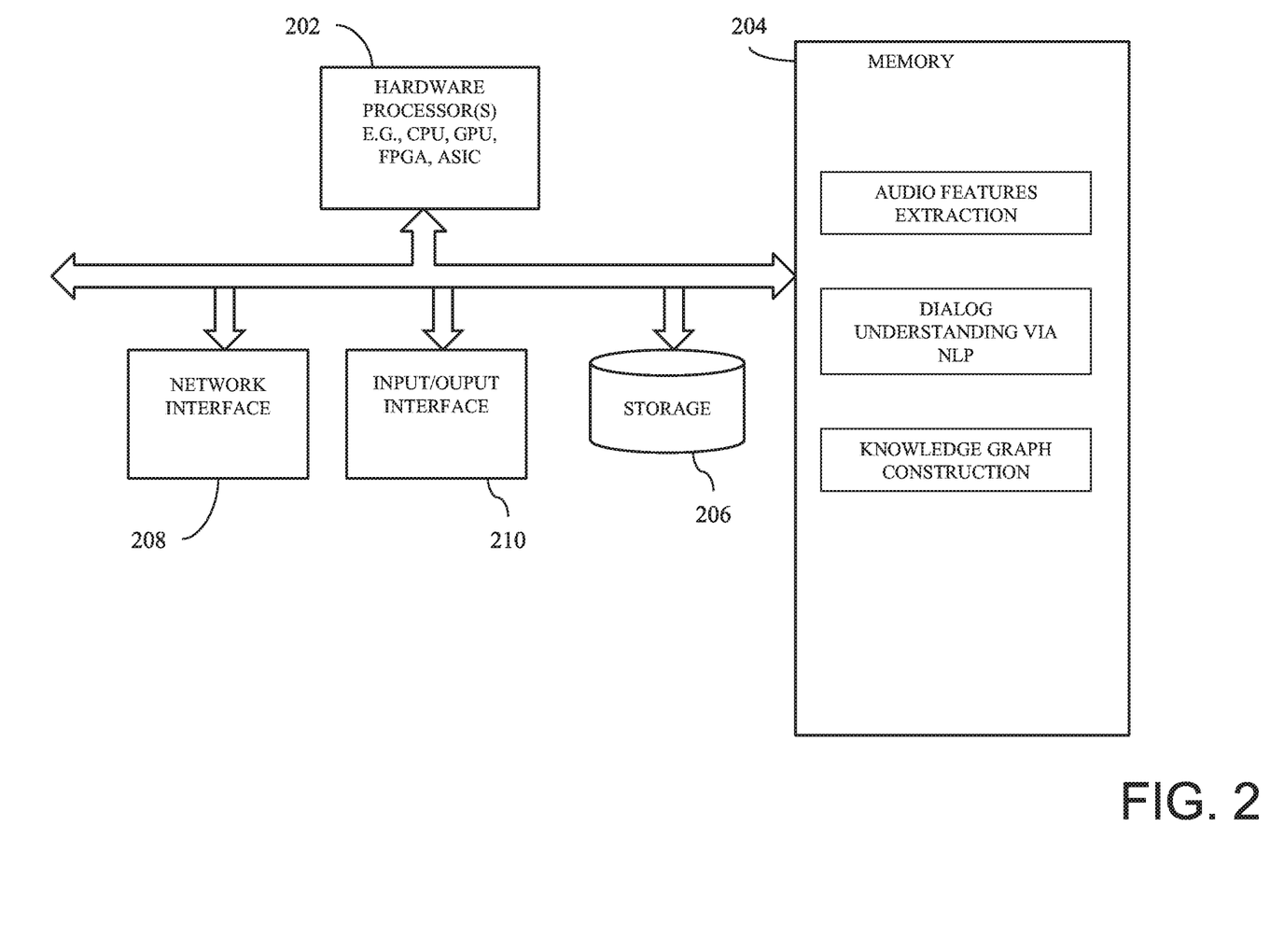
FIG. 2 is a diagram showing components of a system in one embodiment that automatically identifies speakers in real-time through media processing with dialog understanding supported by artificial intelligence (AI) techniques in one embodiment.

FIG. 2 is a diagram showing components of a system in one embodiment that automatically identifies speakers in real-time through media processing with dialog understanding supported by artificial intelligence (AI) techniques in one embodiment. One or more hardware processors 202 such as a Central Processing Unit (CPU), a Graphic processing Unit (GPU), a Field Programmable Gate Array (FPGA), an application specific integrated circuit (ASIC), and/or another processor, may be coupled with a memory device 204, and automatically identify speakers in real-time through media processing. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. The memory device 204 may, for example, store instructions and/or data for functioning of the one or more hardware processors 202, and may include an operating system and other program of instructions and/or data. The one or more hardware processors 202 may receive input comprising audio stream of speaker speaking, for example, during an online conference meeting, in which the participants may speak via a microphone coupled to a participant device and a telephone. At least one hardware processor 202 may perform functionalities such as audio features extraction to recognize speaker voice characteristics and correlate the speaker voice characteristics with speaker identification (ID). The at least one hardware processor 202 may also perform functionalities such as understanding the dialog or the speaker's speech content through natural language processing, and build or construct a knowledge graph that stores a link between voice characteristics of a speaker identified by speaker ID with the speaker's names and attributes. In one aspect, a knowledge base or a database of information may be stored in a storage device 206 or received via a network interface 208 from a remote device, and may be temporarily loaded into the memory device 204 for processing. The one or more hardware processors 202 may be coupled with interface devices such as a network interface 208 for communicating with remote systems, for example, via a network, and an input/output interface 210 for communicating with input and/or output devices such as a keyboard, mouse, display, and/or others.

Figure 3:
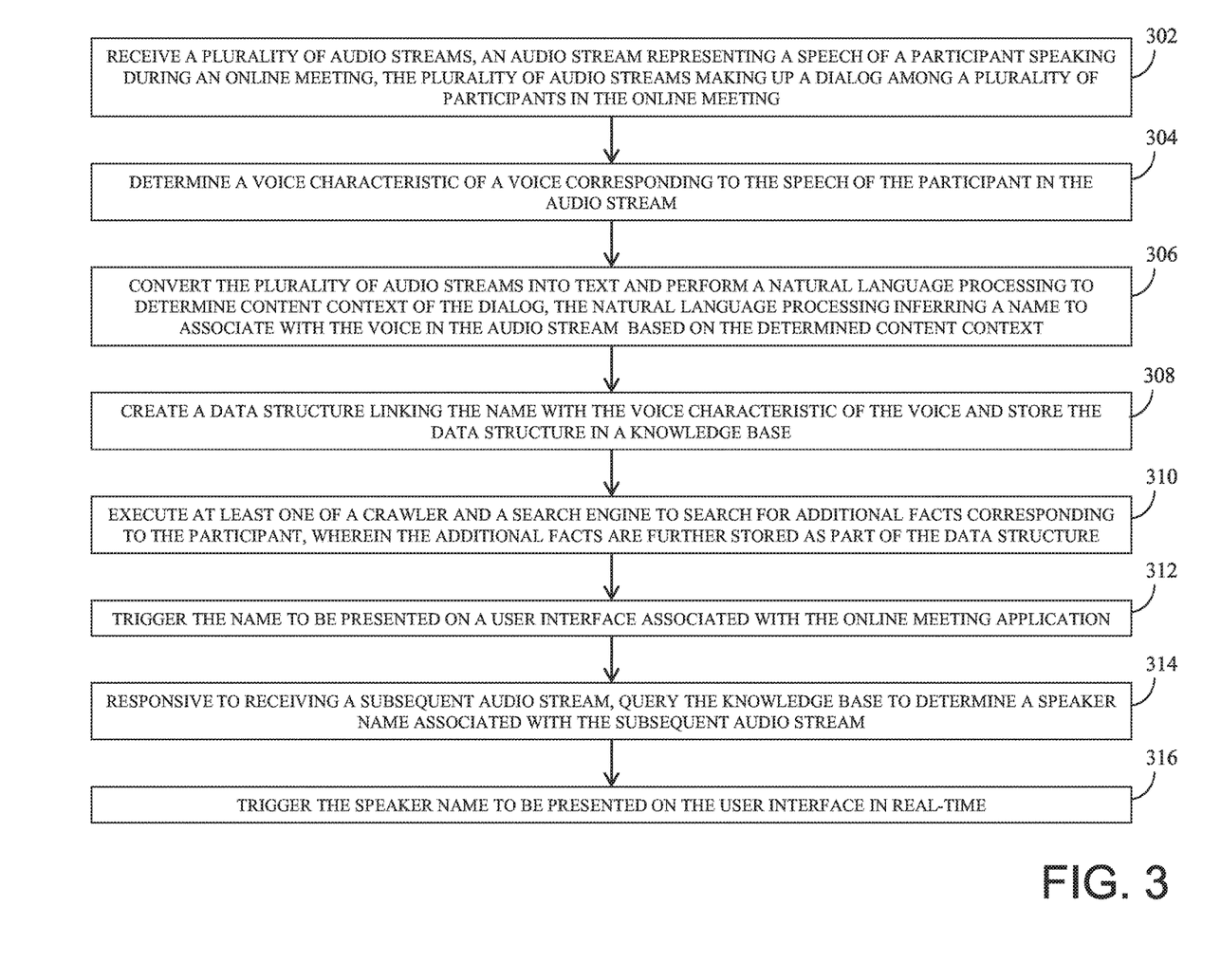
FIG. 3 is a flow diagram illustrating a method of automatically identifying speakers in real-time through media processing with dialog understanding in one embodiment.

FIG. 3 is a flow diagram illustrating a method of automatically identifying speakers in real-time through media processing with dialog understanding in one embodiment. The method, in some aspects, may be performed by at least one hardware processor executing an online meeting application. At 302, a plurality of audio streams is received. For example, each audio stream represents a speech uttered by a participant speaking into a microphone during an online meeting. The plurality of audio streams makes up a dialog or conversation occurring among a plurality of participants in the online meeting.

At 304, a voice characteristic or a set of voice characteristics of a voice corresponding to the speech of the participant in the audio stream may be determined. This may be done for all the audio streams such that there may be a unique voice characteristic or a unique set of characteristics identified for each of different speakers in the dialog. Each of the unique voice characteristic or the unique set of voice characteristics may be given an identifier.

At 306, the plurality of audio streams is converted into text. A natural language processing is performed on the text to determine content context of the dialog, and the natural language processing infers a name to associate with the voice (voice characteristic or a set of voice characteristics) in the audio stream based on the determined content context. For instance, the natural language processing component may parse the sentence in the speech and determine various parts of the sentence, inferring a name of the speaker, if any, in the speech. The natural language processing component may also consider a sequence of speeches in a dialog or conversation to link a voice feature of a speaker with a speaker name or identity.

At 308, a data structure linking the name or speaker identifier with the voice characteristic of the voice may be created and the data structure is stored in a database or a knowledge base.

At 310, at least one of a crawler and a search engine may be executed to search for additional facts corresponding to the participant, wherein the additional facts are further stored as part of the data structure. Additional facts, for example, may include the speaker's full name.

At 312, a user interface associated with the online meeting application may be triggered to present the name or the speaker identifier on the user interface. For instance, the speaker's name may be displayed on a user interface of the online meeting.

At 314, subsequent audio streams may be received, and responsive to receiving a subsequent audio stream, the knowledge base is queried to determine a speaker name or identifier associated with the subsequent audio stream, for example, who is speaking in the subsequent audio stream. For example, voice characteristic or characteristics associated with the subsequent audio stream may be extracted, and the knowledge base may be queried using the voice characteristic or characteristics. The knowledge base returns the speaker name or speaker identifier linked to the voice characteristic or characteristics.

At 316, the queried speaker name may be presented or triggered to be presented on the user interface, for example, in real-time, as the online meeting conversation or dialog is being conducted via the user interface.

Figure 5:
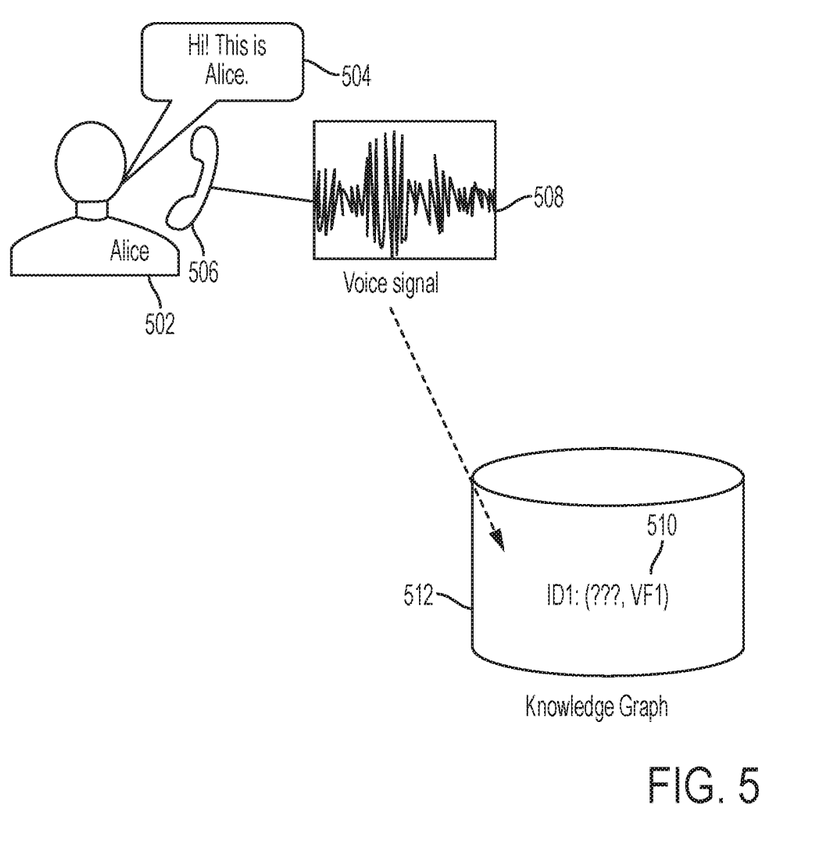
FIGS. 5-11 illustrate a use case of automatically identifying a speaker in online conference meeting in one embodiment.

FIGS. 5-11 illustrate a use case of automatically identifying a speaker in online meeting during a dialog or conversation occurring in the online meeting in one embodiment. Referring to FIG. 5, a speaker 502 utters speech 504 in natural language, for example, into a microphone of the speaker's device 506 (e.g., telephone, computer, laptop, smartphone, tablet, and/or another device), and the speaker's device transmits the speaker's utterance to at least one hardware processor which may implement a methodology of the present disclosure in one embodiment. For instance, the voice signal 508 of the speaker is captured or received and analyzed, for example, as described above. For example, voice characteristic or feature (or a set of voice characteristics or features) may be extracted or determined from the voice signal 508, and an identifier (e.g., ID1) may be assigned or associated with the voice feature of voice signal 508. A data structure is built or populated as shown at 510. For instance, the data structure may include an identifier (e.g., ID1) associated with the voice feature (e.g., VF1) and a field for a speaker name or identifier, and may be stored in a knowledge base 512.

Figure 6:
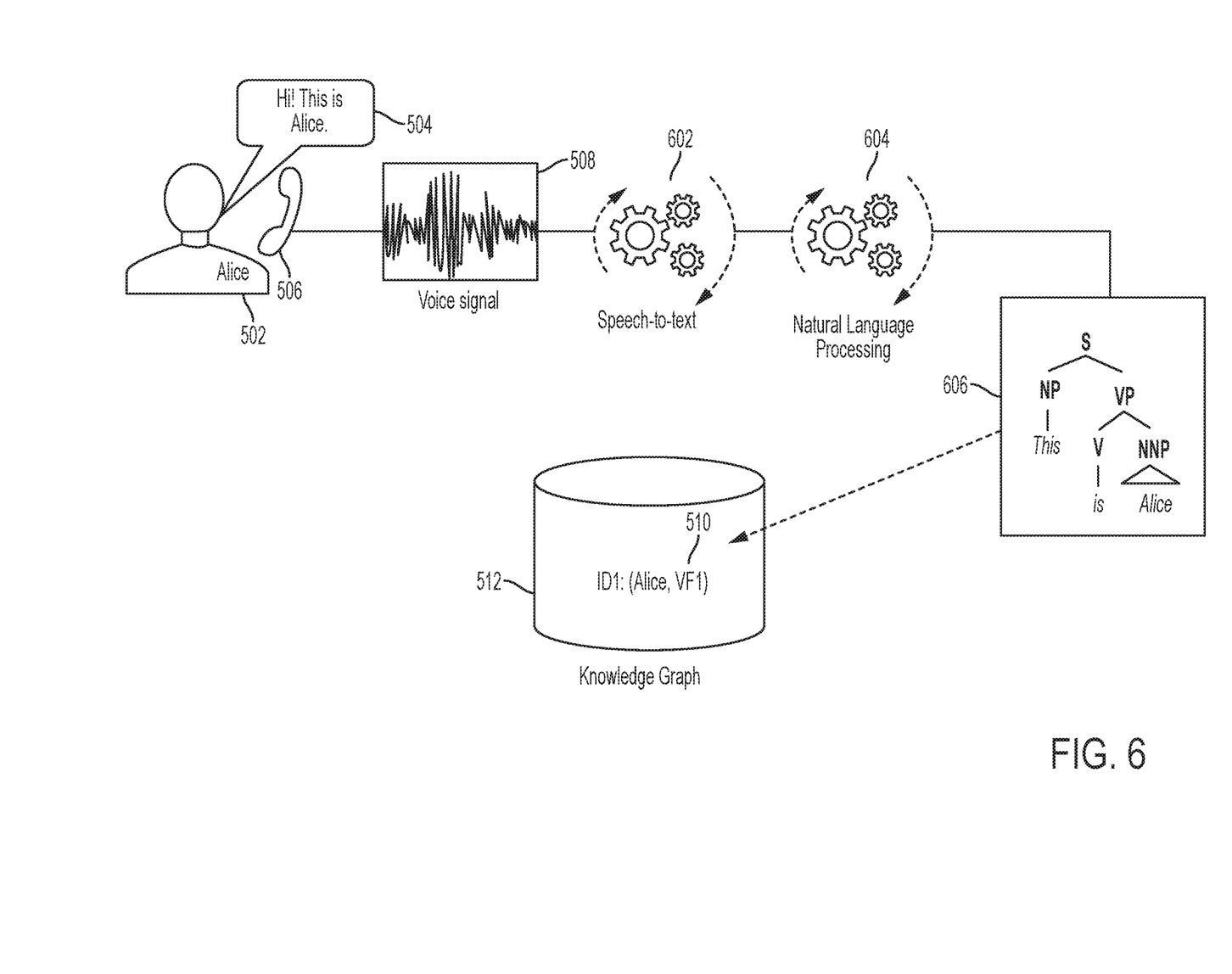

Referring to FIG. 6, the voice signal 508 is input to a speech-to-text converter 602, which transforms or converts the voice signal representing speech to text. The text is input to a natural language processing component or functionality 604, which analyzes the text, for example, performing syntactic and semantic analysis, for example, shown at 606. The natural language processing component 604 infers a speaker's name or identity based on the analysis 606 and links the voice characteristic (VF1) of the voice signal 508 with the speaker's name or identity, for example, by populating the data structure 510. The data structure 510 is stored on a storage device as part of a knowledge base 512, also referred to as a knowledge graph.

Figure 7:
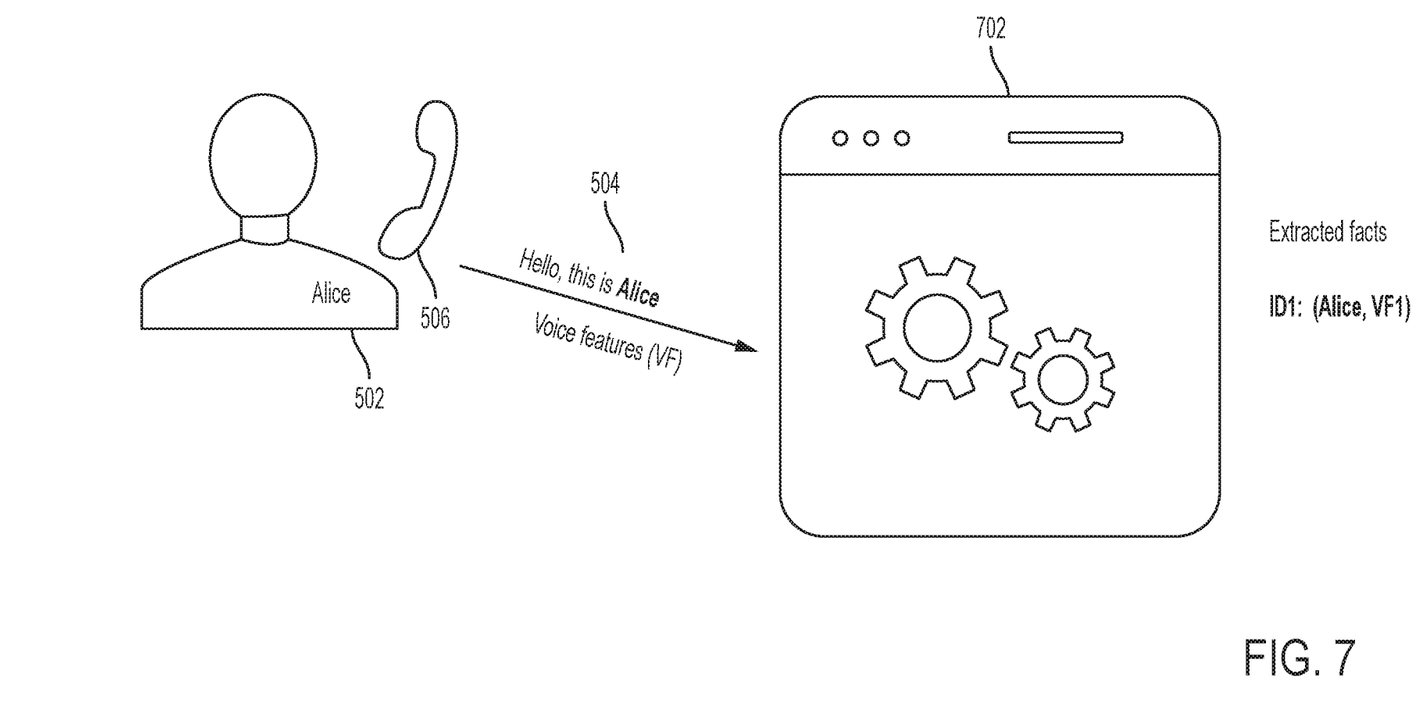

FIG. 7 shows a diagram illustrating the automatically identified speaker name result in one embodiment, for example, as described with reference to FIGS. 5-6. The processing component 702, for example, may include the speech-to-text and natural language components 602, 604 shown in FIG. 6. For instance, the processing at 702 infers that voice characteristic VF1 is associated with speaker, Alice.

Figure 8:
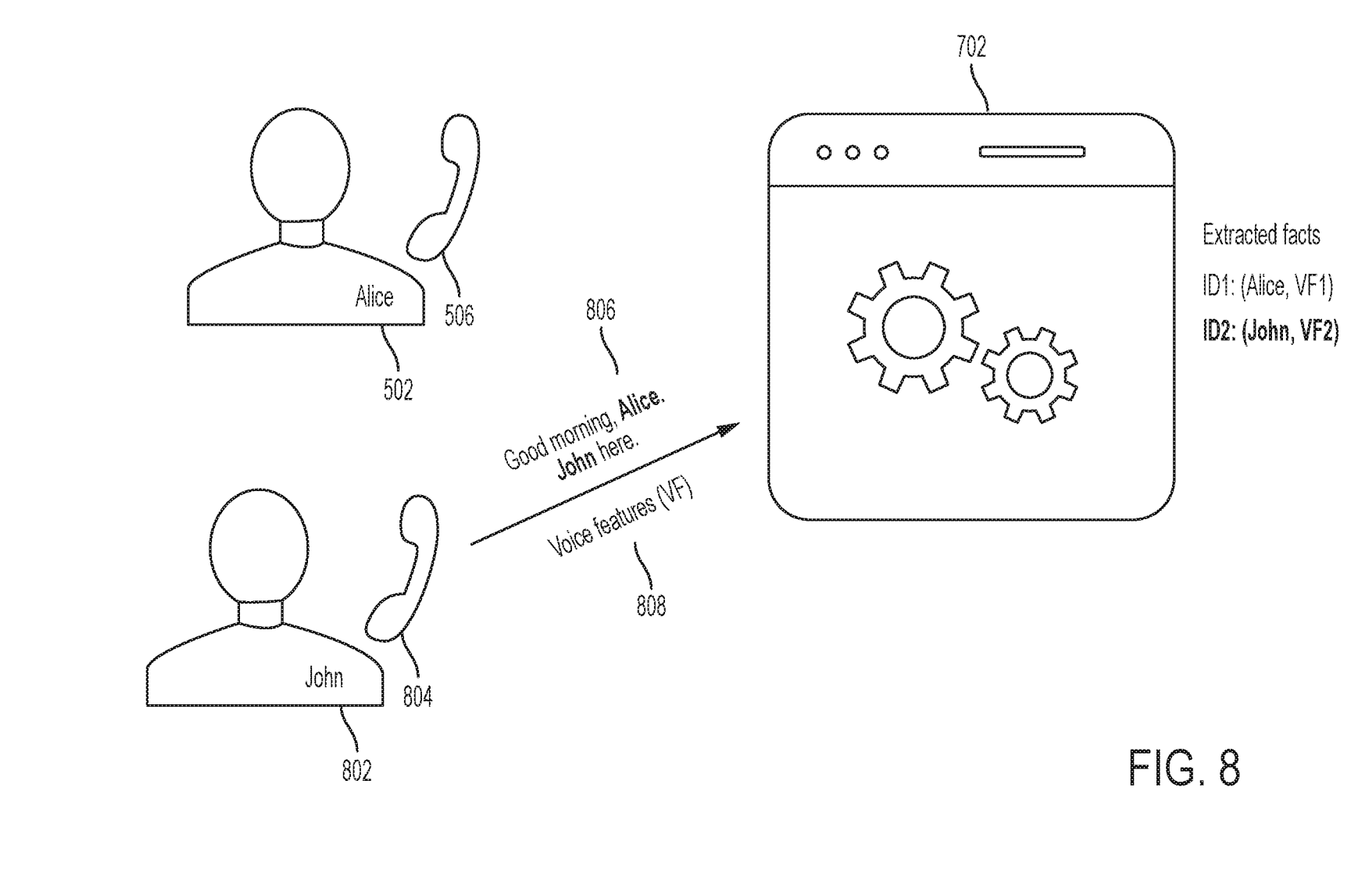

Referring to FIG. 8, another speaker 802 participating in the online meeting speaks, for example, as shown at 806, via the speaker's device 804. A voice characteristic or feature (e.g., VF2) 808 of the speaker 802 is extracted, and the processing at 702 determines that the voice feature 808 is associated with speaker, John, for example, based on performing a natural language processing, for instance, as shown in FIG. 6. A data structure is built or populated that links the voice feature, VF2, with John.

Figure 9:
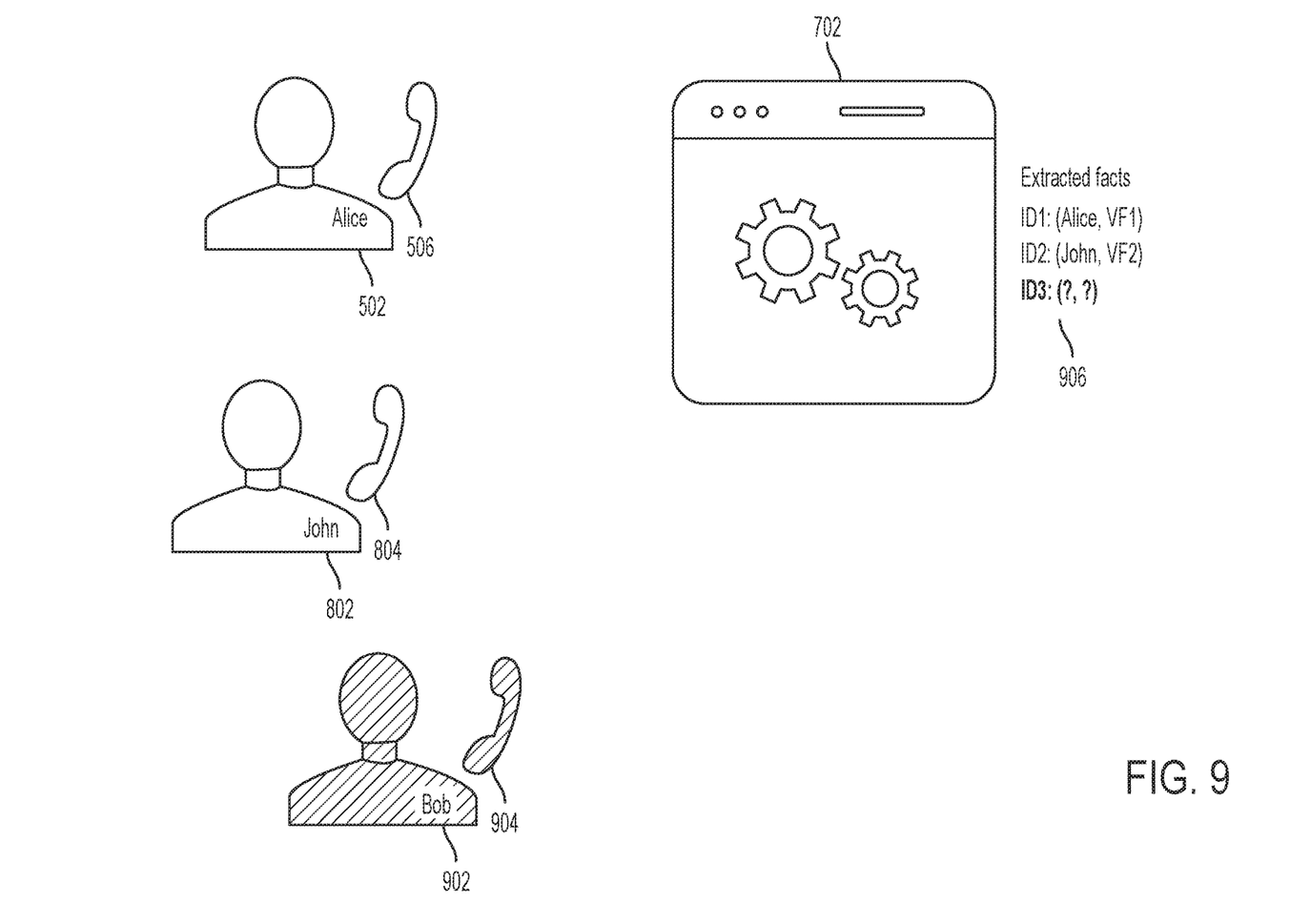

Referring to FIG. 9, yet another speaker 902 is participating in the online meeting, and may be speaking through a device 904. This speaker's voice feature and name (or identity) is unknown or not recorded in a data structure, as shown at 906.

Figure 10:
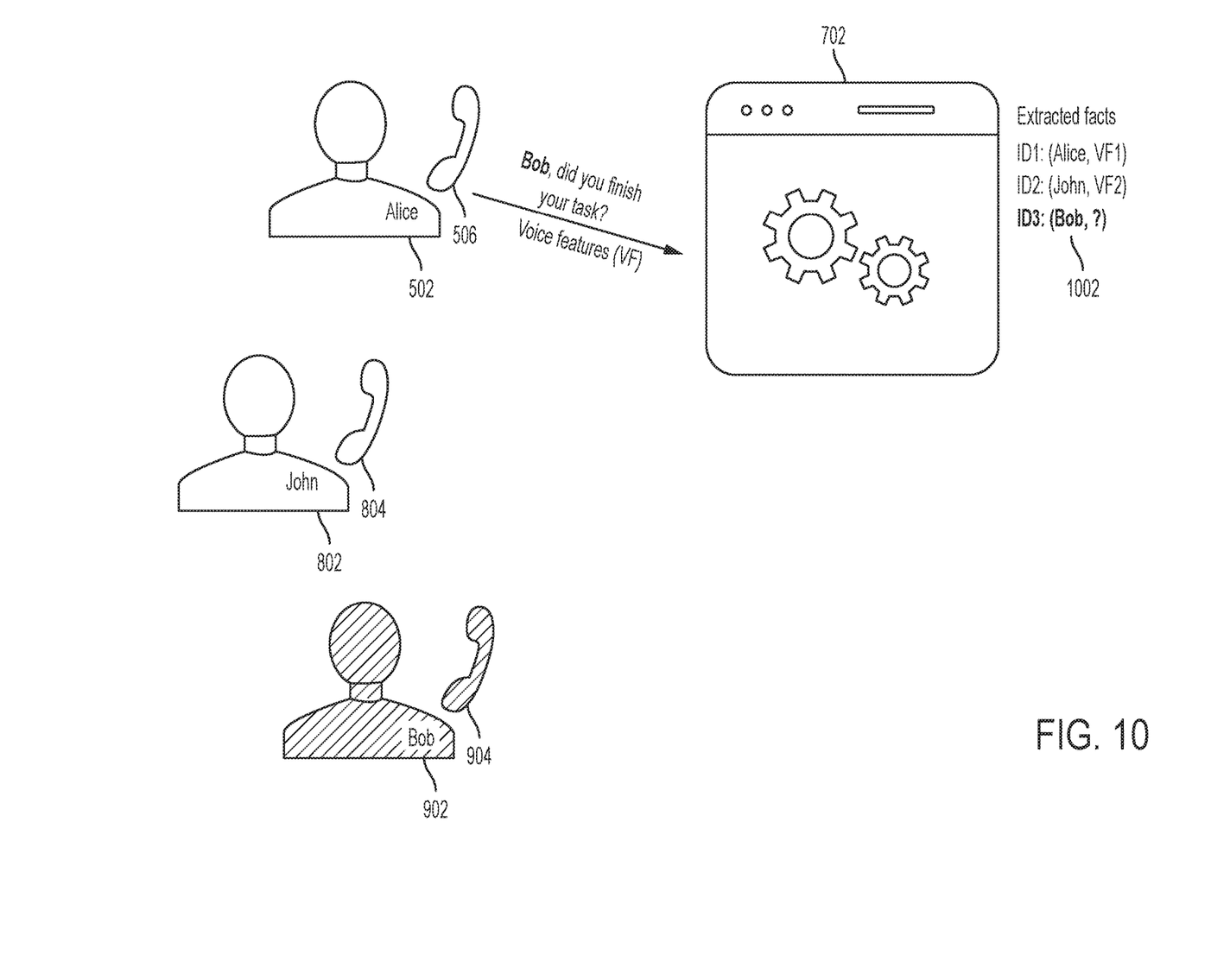

Referring to FIG. 10, during the conversation in the online meeting, a speaker 502 speaking is detected. The speaker's voice feature is determined or extracted from the voice signal (e.g., VF1), and querying the knowledgebase or knowledge graph previously built using the voice feature (e.g., VF1), it is determined that the speaker's identity is Alice. Further, the natural language processing at 702 (e.g., as shown at 606 in FIG. 6) discovers or determines that the speaker, Alice, is addressing another speaker, Bob, in the speech. Responsive to such discovery, a data structure is populated, for example, as shown at 1002, with a speaker's identity or name. At this stage in the dialog, however, the voice feature of this participant, Bob, is not known in the knowledge base.

Figure 11:
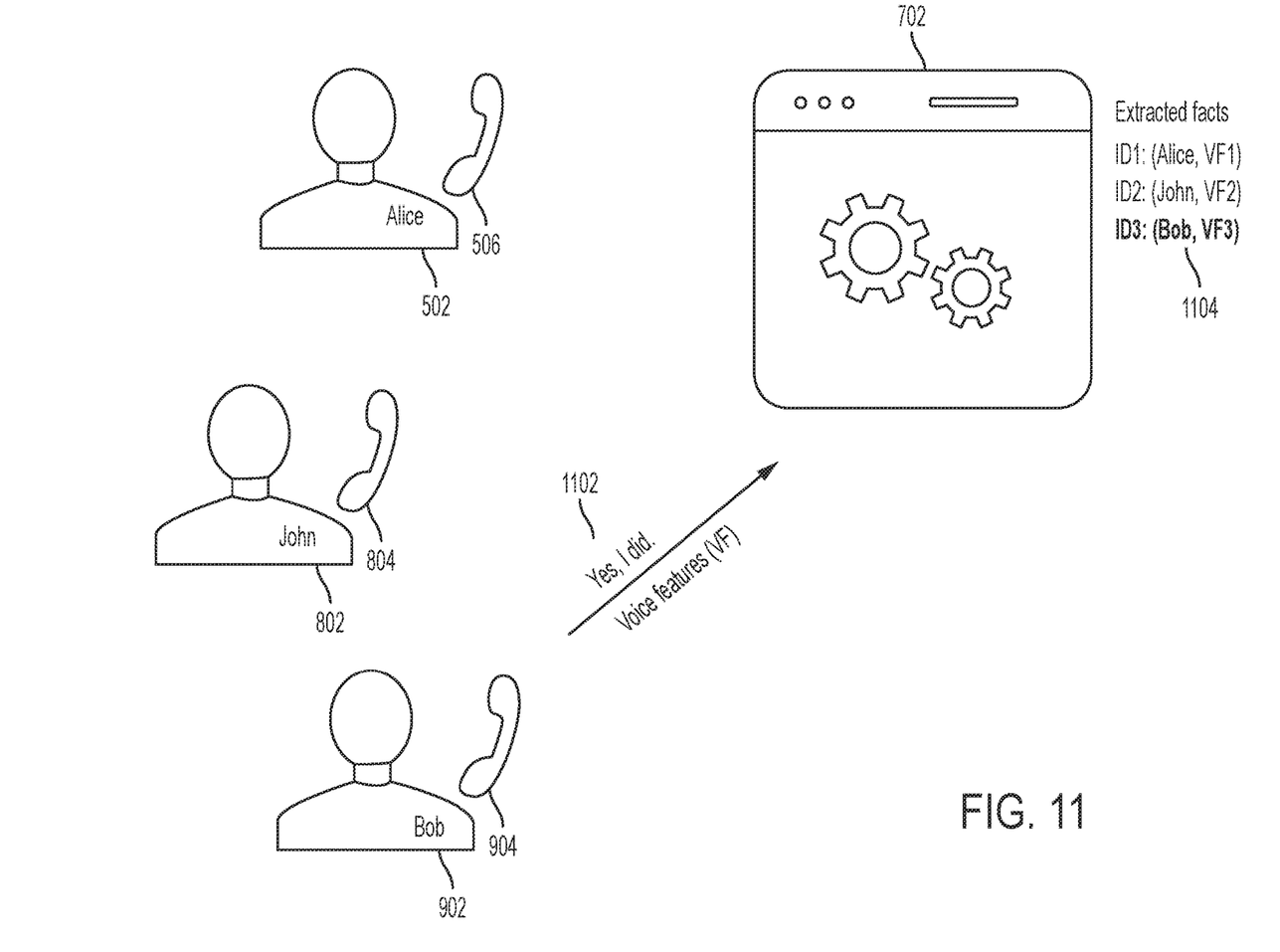

Referring to FIG. 11, yet another speaker speaking is detected, e.g., shown at 1102. The voice feature (e.g., VF3) associated with this speaker's voice is determined from the voice signal of the speaker. Querying the knowledge base, it is determined that the knowledge base does not yet have a data structure populated with this voice feature. Moreover, by performing the natural language processing of this speech in consideration with a previous speech (e.g., the on-going dialog), it is determined that this speech is made in response to the previous speaker's question (e.g., Alice addressing "Bob") shown in FIG. 10. The natural language processing thus infers that this voice feature (VF3) is associated with a speaker whose name or identity is Bob, and links the voice feature (VF3) with speaker name Bob, e.g., by populating the data structure that was populated with speaker name Bob, e.g., as shown at 1102. In this way, the participants of an online meeting need not explicitly introduce their names or identities during a call or meeting, as the system and/or method of the present disclosure may automatically identify the speaker identities based on analyzing the ongoing dialog in the meeting.

Figure 4:
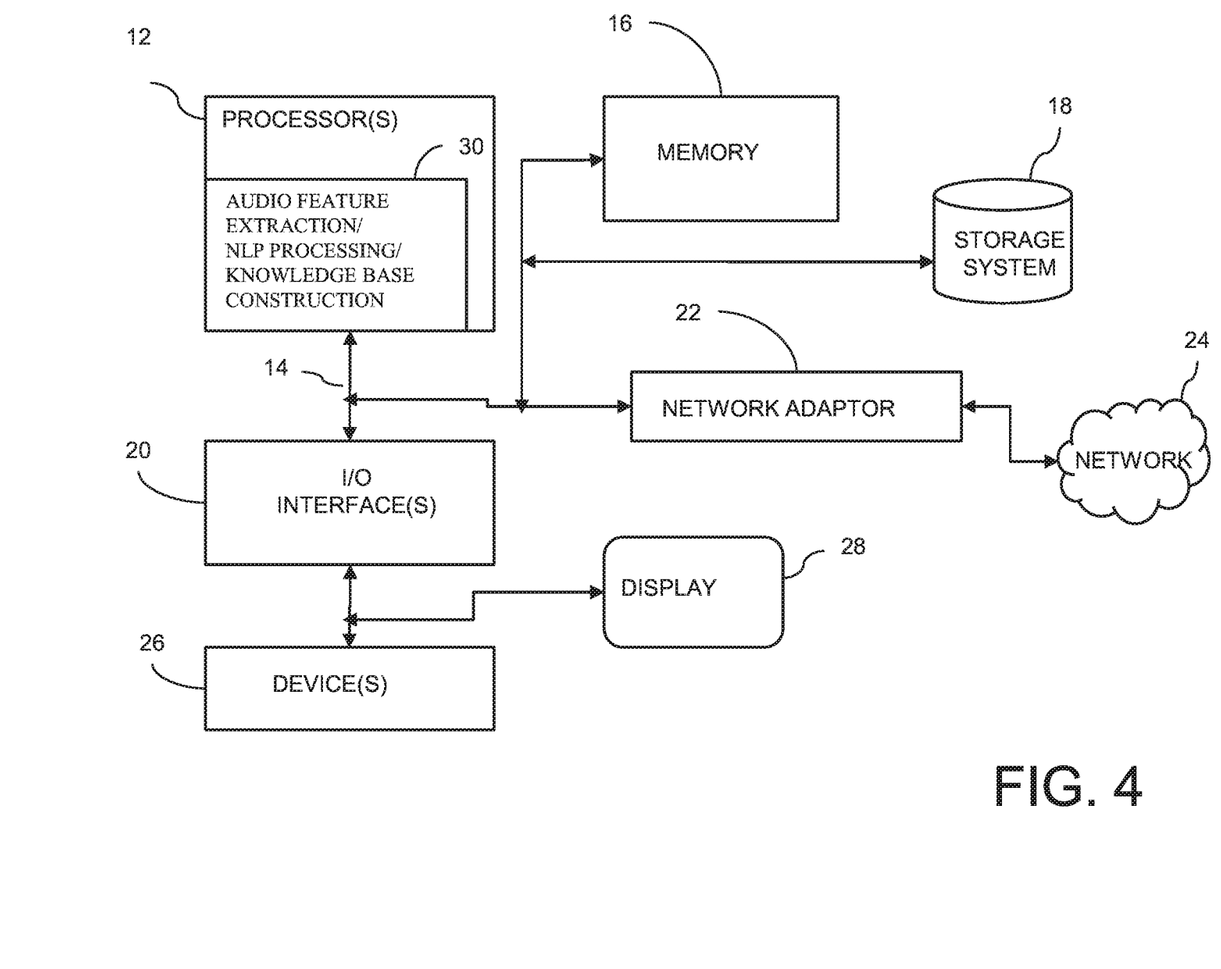
FIG. 4 illustrates a schematic of an example computer or processing system that may implement a system in one embodiment of the present disclosure.

FIG. 4 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method performed by at least one hardware processor executing an online meeting application, comprising:
    receiving a plurality of audio streams, an audio stream representing a speech of a participant speaking into a microphone during an online meeting, the plurality of audio streams forming a dialog among a plurality of participants in the online meeting;
    determining a voice characteristic of a voice corresponding to the speech of the participant in the audio stream;
    converting the plurality of audio streams into text and performing a natural language processing to determine content context of the dialog, the natural language processing identifying a name uttered in at least one of the plurality of the audio streams, to associate with the voice in the audio stream based on the determined content context;
    creating a data structure linking the name with the voice characteristic of the voice and storing the data structure in a knowledge base;
    triggering the name to be presented on a user interface associated with the online meeting application;
    responsive to the participant addressing another speaker by said another speaker's identifier with a question, populating the data structure with said another speaker's identifier;
    responsive to detecting another audio in the dialog and determining said another audio is not recognized in the knowledge base and said another audio does not include said another speaker's identifier, inferring, based on at least determining by the natural language processing that said another audio is made in response to the question, that said another audio belongs to said another speaker; and
    linking the data structure populated with said another speaker's identifier with voice characteristics associated with said another audio.

2. The method of claim 1, wherein the receiving the audio stream comprises receiving analog waves representing the speech and translating the analog waves into digital data that represents the speech.

3. The method of claim 1, wherein the inferring a name to associate with the voice in the audio stream is performed with respect to voices of the plurality of participants.

4. The method of claim 3, wherein responsive to receiving a subsequent audio stream, querying the knowledge base to determine a speaker name associated with the subsequent audio stream.

5. The method of claim 4, further comprising extracting voice characteristics associated with the subsequent audio stream, wherein the querying comprises querying the knowledge base with the extracted voice characteristics.

6. The method of claim 5, further comprising,
    triggering the speaker name to be presented on the user interface in real-time.

7. The method of claim 1, further comprising executing at least one of a crawler and a search engine to search for additional facts corresponding to the participant, wherein the additional facts are further stored as part of the data structure.

8. A computer readable storage medium storing a program of instructions executable by a machine to perform a method comprising:
    receiving a plurality of audio streams, an audio stream representing a speech of a participant speaking into a microphone during an online meeting, the plurality of audio streams forming a dialog among a plurality of participants in the online meeting;
    determining a voice characteristic of a voice corresponding to the speech of the participant in the audio stream;
    converting the plurality of audio streams into text and performing a natural language processing to determine content context of the dialog, the natural language processing identifying a name uttered in at least one of the plurality of the audio streams, to associate with the voice in the audio stream based on the determined content context;

creating a data structure linking the name with the voice characteristic of the voice and storing the data structure in a knowledge base;

triggering the name to be presented on a user interface associated with the online meeting application;

responsive to the participant addressing another speaker by said another speaker's identifier with a question, populating the data structure with said another speaker's identifier;

responsive to detecting another audio in the dialog and determining said another audio is not recognized in the knowledge base and said another audio does not include said another speaker's identifier, inferring, based on at least determining by the natural language processing that said another audio is made in response to the question, that said another audio belongs to said another speaker; and linking the data structure populated with said another speaker's identifier with voice characteristics associated with said another audio.

9. The computer readable storage medium of claim 8, wherein the receiving the audio stream comprises receiving analog waves representing the speech and translating the analog waves into digital data that represents the speech.

10. The computer readable storage medium of claim 8, wherein the inferring a name to associate with the voice in the audio stream is performed with respect to voices of the plurality of participants.

11. The computer readable storage medium of claim 10, wherein responsive to receiving a subsequent audio stream, querying the knowledge base to determine a speaker name associated with the subsequent audio stream.

12. The computer readable storage medium of claim 11, further comprising extracting voice characteristics associated with the subsequent audio stream, wherein the querying comprises querying the knowledge base with the extracted voice characteristics.

13. The computer readable storage medium of claim 12, further comprising,
triggering the speaker name to be presented on the user interface in real-time.

14. The computer readable storage medium of claim 8, further comprising executing at least one of a crawler and a search engine to search for additional facts corresponding to the participant, wherein the additional facts are further stored as part of the data structure.

15. A system of automatically identifying speakers in real-time through media processing with dialog understanding, comprising:

at least one hardware processor;
a memory device coupled to the at least one hardware processor;
the at least one hardware processor operable to:
receive a plurality of audio streams, an audio stream representing a speech of a participant speaking into a microphone during an online meeting, the plurality of audio streams forming a dialog among a plurality of participants in the online meeting;

determine a voice characteristic of a voice corresponding to the speech of the participant in the audio stream;

convert the plurality of audio streams into text and perform a natural language processing to determine content context of the dialog, the natural language processing identifying a name uttered in at least one of the plurality of the audio streams, to associate with the voice in the audio stream based on the determined content context;

create a data structure linking the name with the voice characteristic of the voice and store the data structure on the memory device as part of a knowledge base;

trigger the name to be presented on a user interface associated with the online meeting application;

responsive to the participant addressing another speaker by said another speaker's identifier with a question, populate the data structure with said another speaker's identifier;

responsive to detecting another audio in the dialog and determining said another audio is not recognized in the knowledge base and said another audio does not include said another speaker's identifier, infer, based on at least determining by the natural language processing that said another audio is made in response to the question, that said another audio belongs to said another speaker; and link the data structure populated with said another speaker's identifier with voice characteristics associated with said another audio.

16. The system of claim 15, wherein the at least one hardware processor receiving the audio stream comprises the at least one hardware processor receiving analog waves representing the speech and translating the analog waves into digital data that represents the speech.

17. The system of claim 16, wherein responsive to receiving a subsequent audio stream, extracting voice characteristics associated with the subsequent audio stream and querying the knowledge base with the extracted voice characteristics as input to determine a speaker name associated with the subsequent audio stream.

18. The system of claim 17, wherein the at least one hardware processor triggers the speaker name to be presented on the user interface in real-time.

19. The system of claim 15, wherein the at least one hardware processor further invokes at least one of a crawler and a search engine to search for additional facts corresponding to the participant, wherein the additional facts are further stored as part of the data structure.

* * * * *